United States Patent Office 3,441,418
Patented Apr. 29, 1969

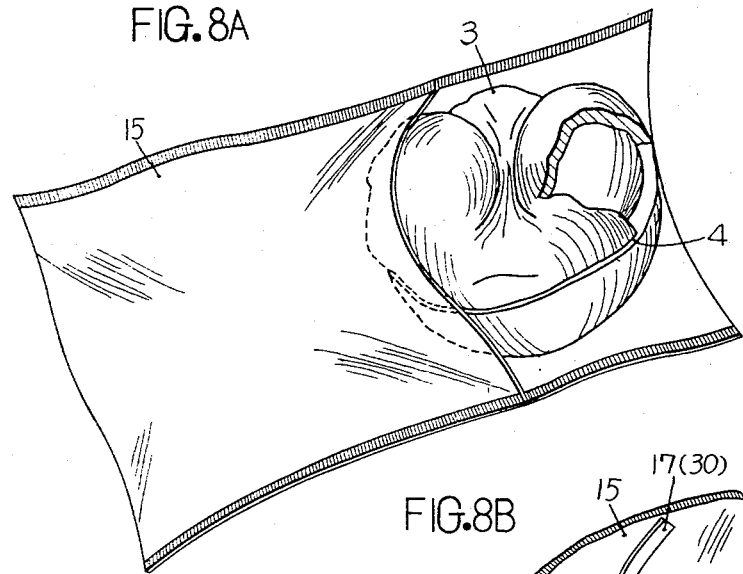
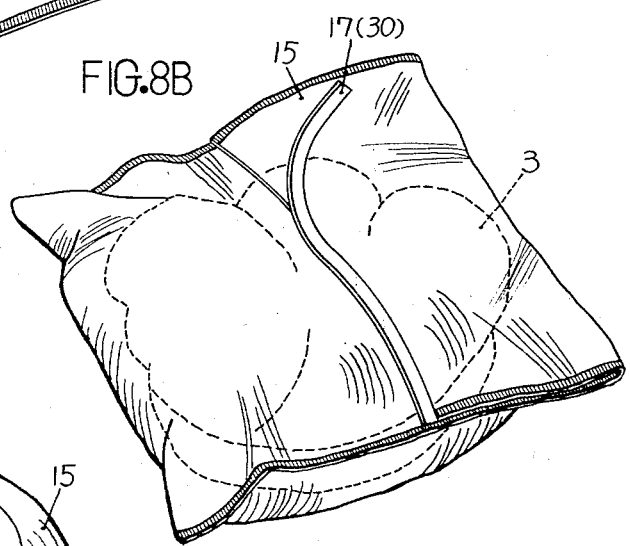
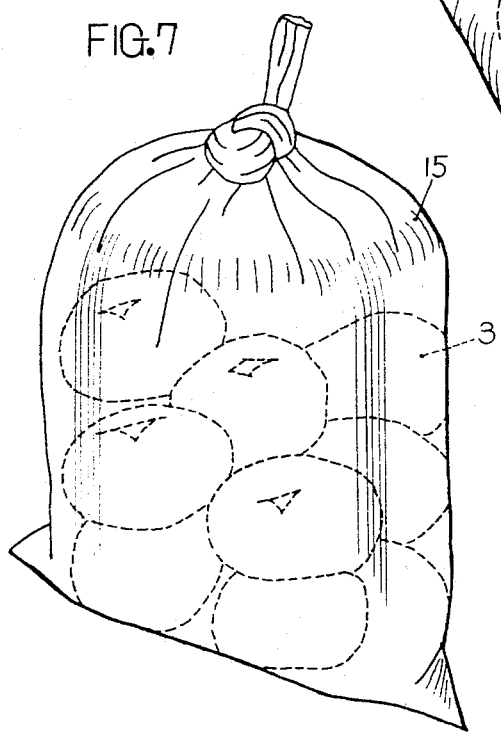

3,441,418
PRODUCTION OF INSTANT-TYPE CREAM PUFFS
Yozo Nishikiori, No. 12 Shiba Mishima-cho, Minato-ku, Tokyo, Japan
Filed July 29, 1965, Ser. No. 475,717
Claims priority, application Japan, Aug. 1, 1964, 39/43,669
Int. Cl. A21d *13/08;* B65b *23/00*
U.S. Cl. 99—86   4 Claims

ABSTRACT OF THE DISCLOSURE

A process for making cream puffs in which the casing material moves through oven zones of gradually increasing temperature, and the zones have a lateral temperature differential whereby the top and bottom surfaces of the casing are baked at different temperatures. The casings are then dried and stored in a plastic package. Hot custard is then inserted into the casings and the casings are put back into the plastic package which is resealed. The casing will expand and soften into a cream puff due to steam emitted by the hot cream.

---

The present invention relates to the production of cream puffs of the instant or ready to eat type.

The conventional cream puffs have poor storability and particularly tend to spoil during warm weather. Therefore, there is an inconvenience in that the cream puffs cannot be on sale in the market or they must be produced in small quantities at frequent intervals during this period of the year.

The invention has as its intention to overcome the inconvenience mentioned above and make it possible to readily obtain very delicious cream puffs at any time.

An object of the invention is to provide the instant type cream puffs which have good preservability and make it possible to obtain complete cream puffs at all times.

Another object of the invention is to provide a steaming bag for easily producing such cream puffs as described above.

Still another object of the invention is to provide the instant cream puffs of the type described wherein the casings and the fillings are in proportionate quantity suitably packed for domestic or commercial use as the case may be.

A further object of the invention is to provide a method for producing such cream puffs as mentioned above, and particularly their casings which are to be filled with cream contents.

Still another object of the invention is to provide a machine for producing cream casings of the type described.

The process for producing the instant cream puffs, according to the present invention, comprises the steps of dissolving a proper quantity of butter in boiling water, adding flour, and gluten if necessary, to said water and thoroughly boiling the same while it is stirringly mixed, putting eggs into the mixture thus obtained after ceasing heat application thereto and again stirringly mixing it, squeezing out and piling up a fixed quantity of said mixture (hereinafter referred to as stock) on a heated plate and baking it, forcedly drying said baked stock by decreasing the surrounding temperature and by using a cold blast so as to make it a hard and dried casing, then putting said casing into a moisture-proof package for storing the same, later taking said casing out of said package, pouring into said casing a proper quantity of cream made by adding water to a custard cream base and by thoroughly boiling the same while such cream is still hot, and placing said casing with cream therein within a moisture-proof and heat-insulated atmosphere, whereby said casing will be ripened by hot steam from said custard cream to turn into a properly soft cream puff.

The details, operational effects and the like of the invention, as well as other objects and constructions thereof, will be naturally apparent from the following description of the preferred forms of the invention shown by way of example in the accompanying drawings in which:

FIG. 7 is a perspective view of an example of steaming bags according to the invention;

FIGS. 8A and 8B are views illustrating the steps of putting the casing containing the custard cream into a packing and ripening bag, and of sealing said bag and ripening its content respectively;

According to the invention, in order to obtain the aforementioned cream casing, its stock may be prepared by using such composition of materials as given by way of example in Table I.

TABLE I

| | |
|---|---|
| Water _____litre__ | 0.9 |
| Butter _____g__ | 120 |
| Gluten [1] _____g__ | 120 |
| Flour [1] _____g__ | 120 |
| Sugar _____g__ | 30 |
| Hen's egg _____ | 10 |

[1] Gluten and flour may preferably be used after sifting.

By utilizing this composition, the stock can be prepared, the steps of which are as follows: First, water poured into a pan is heated, and then butter and sugar are added to it. When the butter is dissolved, flour and gluten are added and the mixture thus obtained is quickly agitated over a slow fire. When this mixture of stock has become transparent and congealed, it is transferred into another container and eggs are successively broken and put into it one by one. Then, this composition is agitated, mixed and kneaded, and thus the completed stock is obtained. A fixed quantity of this stock for each casing is piled up on a heated plate. This is advantageously accomplished by utilizing a squeezing bag, not shown, and squeezing the stock out of said bag onto said plate so as to form it into a round convex shape. Apparatus and method for baking and drying the casings thus obtained according to the invention will be described hereinafter.

Figure 4:
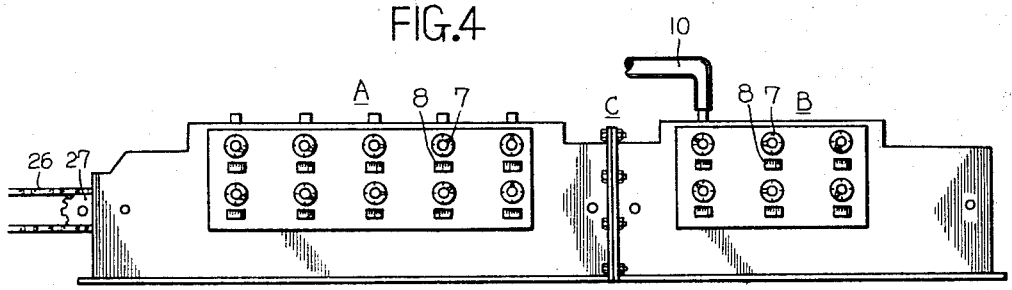
FIGS. 4 and 5 are side and vertical sectional side views of a baking kiln and a drying kiln of the invention.
Figure 5:
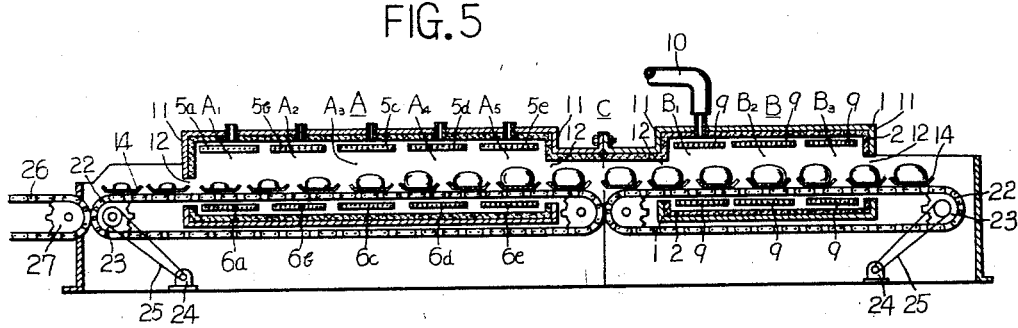
Figure 6:
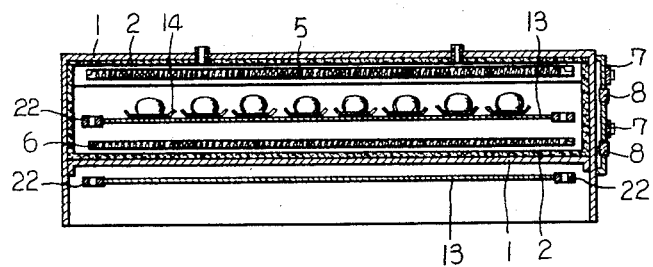
FIG. 6 is a front view in vertical section of the baking kiln.

Referring now to FIGS. 4–6, there is shown a baking kiln A, such as an oven, peripheral walls of which are made of iron panels 1. Attached to the baking kiln A is a drying kiln B substantially similar to the former shape, through a connecting passage C. Peripheral walls thereof are provided with insulating materials 2 which serve to make these kilns heat insulated structures. Within said baking kiln A, a series of Nichrome wire, electric heaters radiating infrared rays or the like 5a, 5b, 5c, 5d, 5e, etc., and a series of electric heaters of the same type 6a, 6b, 6c, 6d, 6e, etc., are disposed in upper and lower rows so as to apply the desired quantity of heat to the fixed positions A1, A2, A3, A4, A5 and so on of the interior of said kiln A. Thermometers 8 each having control switches 7 are installed on the peripheral walls of said baking kiln and associated with their respective electric heaters.

Similarly, in order that the temperature of each of zones B1, B2, B3, etc., of said drying kiln can be kept constant or made adjustable, electric heaters 9 and blast pipes 10 are respectively attached thereto. Thermometers 8 each having a control switch are installed on the peripheral wall of said drying kiln and associated with their respective heaters.

In the vicinity of the bottom edges of the end portions 11 of said baking kiln A and drying kiln B, inlet and outlet ports 12 are apertured, and a conveyor 13 is adapted to pass through said ports and circulate so as to carry a heated plate 14 laid on it. As the conveyor circulates, the stock of casings piled on said heated plate will be successively fed through said kilns. Dry air is supplied into the drying kiln B. Usually, this air flows in the same direction that said conveyor advances, but, if necessary, it is possible to make these directions opposed to each other. A chain and sprocket for advancing said conveyor are shown with the reference numerals 22 and 23 respectively, a prime mover with a speed change gear and a belt for driving the elements described just above are indicated at 24 and 25—these components may be connected to each other in direct driving relationship or through a separate connecting means, and, another conveyor and sprocket for feeding the heated plate 14 onto said conveyor are shown at 26 and 27.

A mode of baking the cream casings of the invention by using said apparatus will now be described.

A number of piles of the casing stock prepared as aforementioned are formed on each of the heated plates 14. Then these plates are placed on the conveyor 13 and successively fed into the baking kiln A through its inlet port 12. As the conveyor advances, the stock fed into the baking kiln A gradually moves toward the right as viewed in the figure and slowly passes throuhg the zones of said kiln successively. In zone A1, the stock begins to inflate slightly and swells up; in zone A2, it inflates further; in zone A3, it fully swells up becoming a light brown color; in zone A4, it stops swelling up and the surface thereof begins to crack by that time; and in zone A5, heat penetrates into the interior thereof sufficiently, thus the baking process is completed.

Casings 3 baked in the manner as mentioned above are suitable for immediate filling with custard cream separately made, but not suitable for such filling after they are laid by and cooled, because since they still contain more than about 30–50% of water, moisture is recovered during storage, so that not only do they become soft and unpalatable, but such softened ones tend to lose shape easily making it difficult to fill them with custard cream.

In accordance with the invention, therefore, the casings 3 just baked as described are fed into the drying kiln B and sufficiently dried up while passing through in it.

Figure 1:
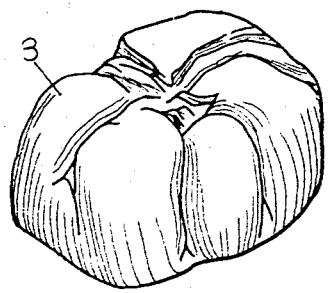
FIG. 1 is a perspective view of a cream casing in accordance with the invention.
Figure 2:
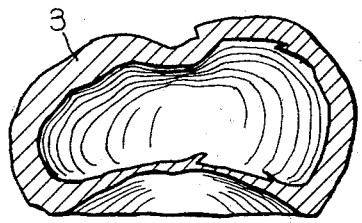
FIG. 2 is a sectional view of said casing.
Figure 3:
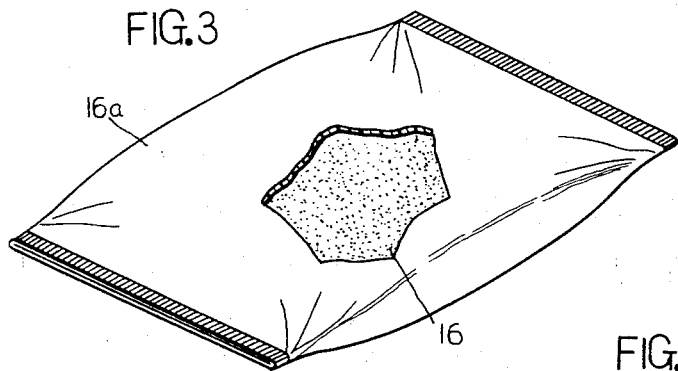
FIG. 3 is a perspective view of the packed base or material of custard cream prepared according to the invention.

An example of such drying process is as follows: As the conveyor moves, the baked casing leaves the baking kiln A through the inlet and outlet port 12, passes through the passage C and enters into the drying kiln B through another inlet and outlet port 12. In the drying kiln, the electric heaters 9 are associated with the blast pipe 10 so that the temperature of said casing can gradually drop to the normal temperature at the outlet while being removed and dried by the air from said blast pipe 10, thereby being brought out of the drying kiln through its port 12 in a sufficiently dried state. Specifically in FIGS. 1–2, such a completed casing 3 is shown. This casing has been thoroughly dried and has become so hard that it can not be easily broken or collapsed by being given a strong grip. It is hardy, light in weight and of a good luster and color.

Table II shows the temperature of both the heated plate 14 and the exhaust port area. Both of them throughout zones A1–A5 of the adjusted baking kiln A and zones B1–B3 of the adjusted drying kiln B, together with the staying time of said plate at each of the zones in said kilns.

TABLE II

| Zone No. | A1 | A2 | A3 | A4 | A5 | B1 | B2 | B3 |
|---|---|---|---|---|---|---|---|---|
| Temperature of exhaust port section (° C.) | 100 | 120 | 120 | 180 | 120 | 80 | 50 | 30 |
| Temperature of heated plate (° C.) | 160 | 160 | 165 | 160 | 100 | 80 | 50 | 30 |
| Staying time of the plate at each zone in the kilns (minute) | 6 | 6 | 6 | 6 | 6 | 6 | 6 | 6 |

Figure 11:
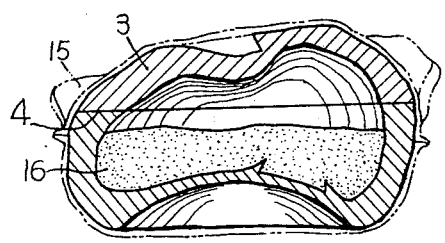
FIG. 11 is a side view in vertical section showing a single type set of the cream puffs.

Said casings 3 can be lumped and then sealingly packed into a moisture proof container or a moisture proof bag 15 of suitable material such as polyethylene, alternatively each one of the casings can be separately packed and sealed into the bag of said type as will be more fully described. Later, a casing will be taken out from its package on demand and divided into two halves by slitting, thus producing slit 4 as shown in FIG. 11. Between these two halves, a proper quantity of thoroughly boiled base of custard cream 16 prepared according to the composition given in Table III will be poured while it is still hot.

TABLE III

An example of composition of custard cream base [1]:

|  | G. |
|---|---|
| Dehydrated whole milk | 50 |
| Sugar (granulated) | 370 |
| Corn starch | 50 |
| Powdery yolk of egg | 20 |
| Powdery white of egg | 8 |
| Flour | 12 |
| Whey powder | 10 |
| Vanilla | 0.5 |

[1] This composition is for 10 cream puffs.

After these components are stirringly mixed, the base thus obtained is put in a moisture proof bag 16a or the like of polyethylene, and later, when necessary, the base may be thoroughly boiled after adding water thereto. In this connection, the total composition shown in Table III is dissolved in 1 litre of water and stirringly mixed and boiled to become cream, and immediately after it is distributed and poured into the ten casings 3, baked and dried as has been said. Next, said casings filled with hot custard cream are ripened within said sealed moisture proof bag 15 (hereinafter also referred to as ripening bag) for a predetermined time. In this case, boiled cream can be poured into the casings 3 without slitting by means of a syringe, instead of dividing the casing into two halves along the slit 4 previously provided around the peripheral edge thereof and charging the cream therebetween.

In about 5–10 minutes, the casing will be softened and ripened by the steam generating from said custard cream turning into a properly soft and nice coating which will harmonize with the cream therein, and thus, a very delicious and tasty cream puff can be quickly obtained. Further, the degree of ripening can be seen from its appearance, that is, the inflating of the ripening bag 15 may be considered to indicate the completion of ripening.

Now, a particularly suitable form of packing said instant type cream puffs as a set will be described.

Figure 9:
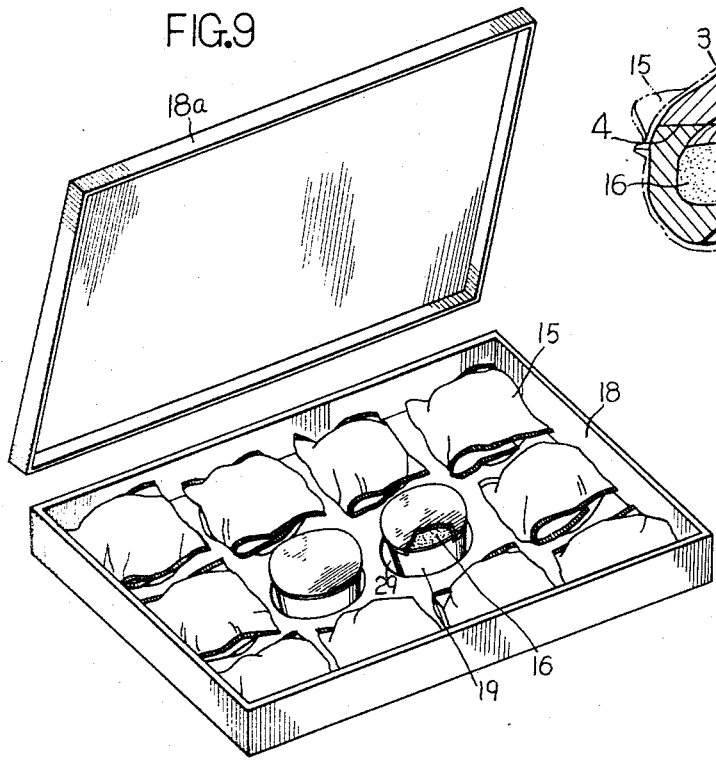
FIG. 9 is a perspective view, partly broken away, of a packing and setting box for the cream puffs of the invention.
Figure 10:
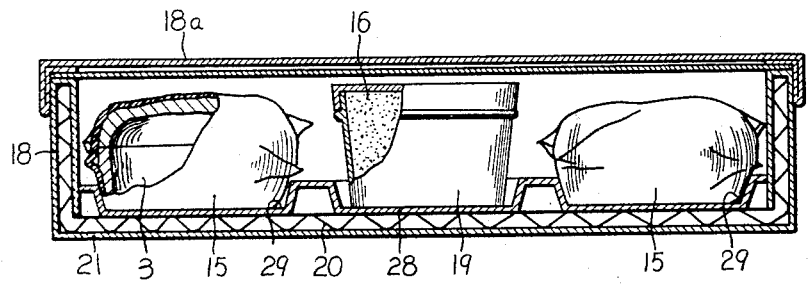
FIG. 10 is a sectional view of the box.

As shown in FIGS. 9–10, one casing 3 is put into the moisture proof bag 15 and the folded back closing portion of said bag sealed by a pressure sensitive adhesive tape 17 of harmless and repeatedly usable type. As a set of such cream puffs, a suitable number, for example ten, of such packages are placed in a moisture proof box 18 and a proper number (for example two) of packages of the custard cream base are put in the box. The cream containers are made of a transparent polyethylene or a vinylidene chloride or other inert material. In these figures, the moisture proof box is shown as a chip box like container comprising a base member 20 of cardboard, a facing paper 21 of polystyrene covering said base member and serving to keep moisture from penetrating to the interior of said container, and a double bottom member 28 made of a polystyrene foam sheet, said bottom member being provided with recesses 29 within which moisture proof packages of the casing 3 and lidded cup-like containers 19 containing the custard cream base fit. The lid of said box 18 is shown at 18a. This set of cream puffs is suitable for private use or as a gift. Further, both the closing piece 30 and container 19 should be nice-looking.

In case that a single cream puff is to be packed alone, a proper quantity of packed or non-packed custard cream base may be put into a casing 3, and these materials can be placed in a packing and ripening bag 15 shown by the phantom line in FIG. 11.

According to the invention, casings are properly baked and at the same time sufficiently dried, and then sealed by the moisture proof bag or bags, so that, if the temperature and humidity may vary during their storage period, they can be preserved in a dried condition for a long time without softening, changing quality or losing shape due to the moisture recovery which otherwise would make it difficult to pour cream stock thereinto. Such casings, at any time, later, can be taken out of the moisture proof bag, filled with hot custard cream made by boiling its base and then placed for a while in a moisture proof heat insulated ripening bag to be softened and ripened by the action of steam and heat from said custard cream, so that the casings will be turned into properly soft, nice and tasty coatings which harmonize with the custard cream filled therein. Thus, very delicious, tasty and healthy cream puffs may be provided. Moreover, such operation as mentioned above can be both domestically and commercially accomplished very healthily and quickly at any time throughout the year.

Further, according to the invention, said moisture proof bag serves to preserve the product in a moisture proof state and to ripen the cream puff, and said casings and custard cream base as a set are a moisture proof package and further proportionately correlated with each other. Moreover, it has become apparent that casings indispensable for the production of the instant cream puffs according to the invention can be quickly and easily produced by utilizing the apparatus of the type described wherein drying kiln B is attached to the baking kiln A, each of said kilns being provided with means for suitably controlling the temperature of the interior of the associated kiln, and wherein a belt consisting of heated plate is provided so as to endlessly advance at a controlled speed through said two kilns.

What I claim is:

1. A process for producing cream puffs comprising: baking a casing material; drying said casing material such that a hard, dry casing is formed; storing said casing in a moisture proof package; removing said casing from said package; adding hot, moist custard cream within said casing; placing said casing and cream while hot in a moisture proof heat insulating enclosure; whereby said casing will be softened and expanded by the moisture from said custard cream thereby becoming a soft cream puff.

2. A process as in claim 1 wherein said baking step comprises moving the casing material through successive oven heat zones of gradually increasing temperature, each of said zones having a lateral temperature differential to apply different temperatures to upper and lower surfaces of said casing material and said drying step comprises moving said casing material through oven zones of progressively decreasing temperature, while passing air over said casings.

3. A process as in claim 1 wherein said package and enclosure both are the same resealable plastic bag.

4. A process as in claim 1 further comprising before said baking step the steps of: dissolving butter in boiling water; adding flour to the above mixture; boiling the above while stirring; stopping the boiling; adding eggs to the above; stirring the above; squeezing the above onto a heated plate in a convex shape; whereby said casing material will be made and shaped.

References Cited
UNITED STATES PATENTS

| | | | |
|---|---|---|---|
| 1,690,753 | 11/1928 | Renneburg | 23—260 |
| 1,710,164 | 4/1929 | Hefler | 206—47 |
| 2,745,751 | 5/1956 | Pichardo | 99—171 |

A. LOUIS MONACELL, *Primary Examiner.*

JAMES R. HOFFMAN, *Assistant Examiner.*